Patented Mar. 3, 1936

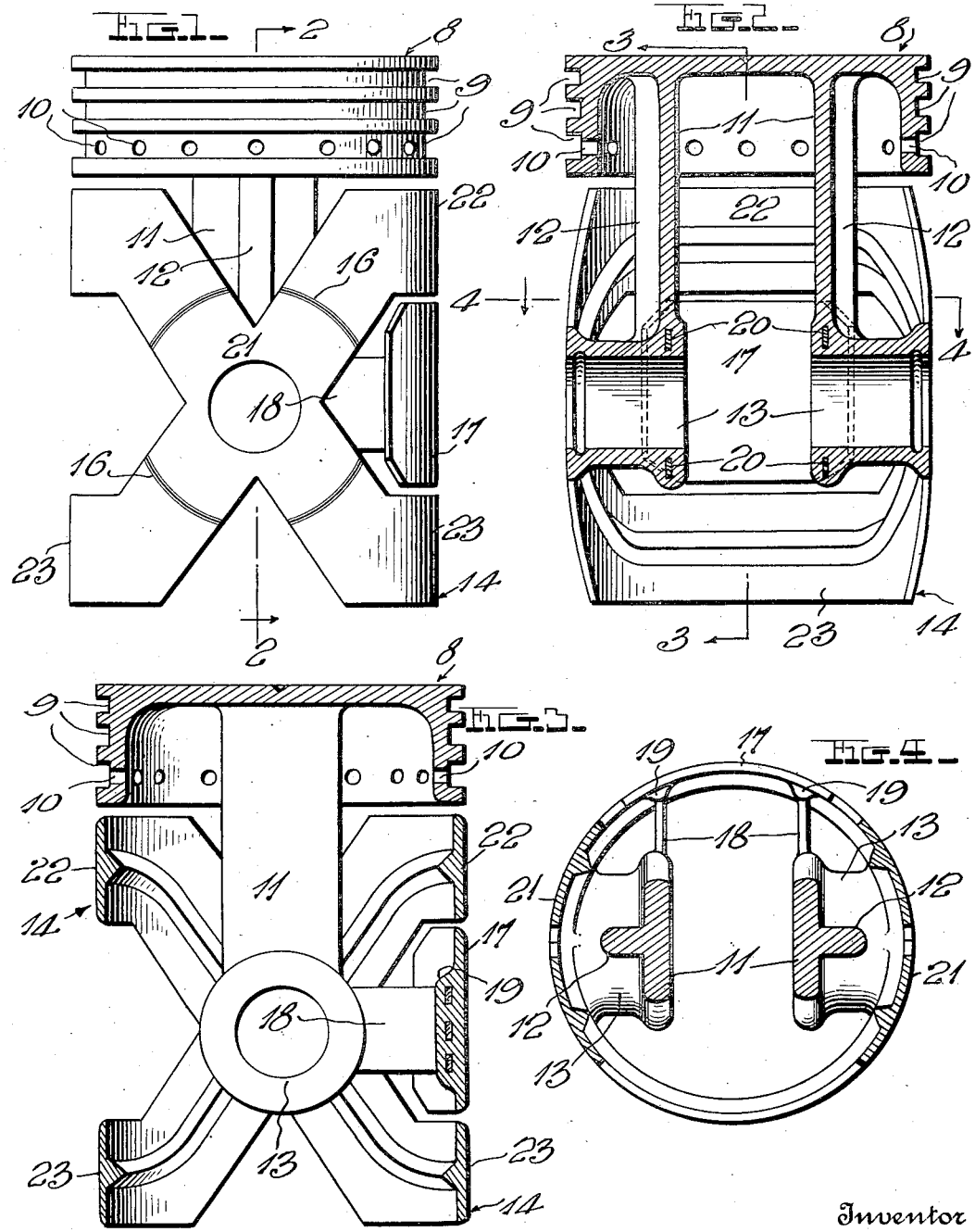

2,032,849

UNITED STATES PATENT OFFICE 2,032,849

PISTON

Arthur A. Nelson, Burlington, Iowa

Application October 15, 1934, Serial No. 748,389
Renewed August 3, 1935

4 Claims. (Cl. 309—13)

This invention relates to a new and improved skirted piston for internal combustion engines in which diametric skirt expansion is so controlled as to permit a full round skirt with no slots or slits or eccentricity, to be fitted with a clearance of one-thousandths (.001) of an inch with no danger of scoring due to excessive wall pressure.

In present pistons, depending upon design, the piston skirt is distorted by piston head expansion at normal running temperature. While this has been practically overcome by pistons in which the head and skirt are separated from each other, it is a reasonable conjecture that piston skirt expansion will not be diminished because of such separation. The necessity of snug fitting pins retards skirt contraction in the slotted types of skirts causing rapid wear in contact with the cylinder wall due to misalignment of pin bosses through restricted diametric expansion.

Approximately one-half of the skirt area of a cam ground piston is utilized for cylinder wall contact. If a three inch diameter cam ground piston be fitted at one-thousandths clearance, the expansion of an alloy being approximately double that of cast iron, it can readily be appreciated that the skirt of the piston will ride the cylinder wall oil film with a pressure equal to the amount that is required to compress the piston seven-thousandths with a pin in place which stiffens the zones of the piston pin bosses. There is evidence to prove that all alloy pistons, when subjected to the demands of powerful high speed, high compression engines, rapidly wear to a point where diametric expansion is no longer restricted by contact of the piston skirts with the cylinder walls. When this point is reached, the piston skirts no longer support the piston heads in such manner that the faces of the rings will have flat contact with the cylinder walls with the result that oil pumping and blow-by occur. Continued rocking of the piston soon becomes an audible piston slap with resultant crystallization and possible breakage of pistons.

Present day pistons do not vary greatly in design from those used in early automobiles. Progress has been made with rings, but in most cases satisfactory results can only be obtained by using inner rings which actually function as shims under the rings and centralize the piston head. Various types of skirt expanders are utilized as a combination with inner rings to permit the faces of the rings to again fit properly against the cylinder wall, and oil control and compression are temporarily restored.

High speed driving temperatures in a straight-eight will cause a lengthening of the crank shaft by several thousandths of an inch. Additional rod lateral will therefore permit the rod to travel on its bearing and on the piston pin so that the rod will not center the piston and with each impulse the piston whether provided with or without relieved sides, will tend to cant parallel to the piston pin. This condition can be verified with a micrometer on any cylinder block. The wear will be found greater at right angles from the thrust side of the cylinder wall.

Some car manufacturers have resorted to off-set piston pins to eliminate piston slap, but this method takes its toll in increased cylinder and piston skirt wear.

My invention overcomes present day difficulties by the provision of a new and improved double-X-web piston whose entire skirt surface rides the cylinder wall and in spite of its cut-out design has more surface contact with the cylinder than a conventional piston. In the double-X-web skirt, heat absorbed from high wall temperature and piston head heat dissipated through head struts to the piston pin bosses will respond to the cooling effect of lower oil temperature because of its open design which permits effective skirt lubrication and better cooling. The double-X-skirt is joined at the X-crossing points to the pin bosses, which bosses are joined to the lower ends of struts which carry the piston head, said head being entirely separated from said skirt. The bosses will retain more heat than the skirt and the expansion will dissipate itself, at first vertically, then diagonally along the X-webs, and then horizontally to points at right angles to the piston pin, and the piston skirt lengthens when its diametric expansion is limited by contact with the cylinder wall. Wall pressure of the skirt is therefore not excessive although sufficiently firm to prevent any lateral piston movement, and effective lubrication can be attained. Moreover, during the expansion of the skirt, its cylindrical form is not varied with the result that the pin bosses are not thrown out of alignment and caused to bind tightly upon the piston pin. The pin may be a snug hand push fit at 75° and the pin bosses will therefore have freedom of movement on the pin so that the rod cannot create excessive friction between piston and cylinder wall even if said rod must move several thousandths with endwise expansion of the crank shaft.

The objects of the invention are attained with the specific construction herein disclosed or equivalents thereof. For illustrative purposes, the accompanying drawing shows a preferred construction.

Figure 1 of the drawing is a side elevation of a piston constructed in accordance with the invention.

Fig. 2 is a sectional view on line 2—2 of Fig. 1.
Fig. 3 is a sectional view on line 3—3 of Fig. 2.
Fig. 4 is a sectional view on line 4—4 of Fig. 2.
In the drawing above briefly described, the numeral 8 denotes a ring-carrying head whose ring grooves are denoted at 9. If desired, small openings 10 may lead from the oil ring groove to the interior of the head.

Two vertical struts 11 preferably having reinforcing ribs 12, are integral at their upper ends with the piston head 8 and are integral at their lower ends with the pin bosses 13. A double-X-web skirt 14 is entirely separate from the head 8 and is integrally joined at its X-crossing points with the pin bosses 13. The skirt 14 is truly cylindrical except that it is relieved say five-thousandths of an inch around the pin bosses as denoted at 16, and it maintains its cylindrical form under all operating conditions.

Laterally spaced from the pin bosses 13 is a power stroke thrust plate 17 which receives the thrust of each power stroke, said plate being integral with the outer ends of two lateral bosses 18 whose inner ends are integrally joined to the bosses 13. These struts 18 may be of material having greater heat-resisting qualities than that from which the other parts of the piston are constructed. Their outer ends may be embedded in bosses or ribs 19 on the inner side of the thrust plate 17 if desired, and the inner ends of said struts may be in the form of open rings 20 concentric with and embedded in the pin bosses 13.

In the specific construction herein shown, the piston skirt includes two X-webs 21, one of which is integrally joined at its crossing point to one of the pin bosses 13, and the other of which is similarly joined at its crossing point to the other of said pin bosses. Upper web-connecting portions 22 integrally connect the upper ends of one of the X-webs 21 with the upper ends of the other of said X-webs, said upper ends and said web-connecting portions being downwardly spaced from the piston head 8 and entirely free of connection with it. Two lower web-connecting portions 23 integrally connect the lower ends of one of the X-webs 21 with the lower ends of the other of said X-webs. The integrally connected X-webs 21 and web-connecting portions 22 and 23 cooperate in forming the strictly cylindrical double-X-web skirt 14. The power stroke thrust plate 17 is disposed between one of the upper web-connecting portions 22 and one of the lower web-connecting portions 23 and said plate is of course provided with the same curvature as the skirt. This plate is entirely free of connection with the skirt and is sufficiently spaced therefrom to allow oil to reach the cylinder wall above and below said plate to insure an effective oil film between plate and wall. Lubrication of all contacting areas of skirt and wall is similarly insured, due to the openwork construction of said skirt.

From the foregoing, taken in connection with the accompanying drawing, it will be seen that novel provision has been made for producing a greatly improved and advantageous piston which will be free from a number of draw-backs which have heretofore existed.

While the details disclosed may be considered as preferred, they should also be considered as illustrative rather than limiting.

I claim:

1. A piston comprising a ring-carrying head, pin boss struts rigid with and projecting downwardly from said head, pin bosses rigidly carried by the lower ends of said struts, and a double-X-web skirt rigidly connected at its X-crossing points with said pin bosses respectively, said skirt being entirely separated from and spaced downwardly from said head.

2. A piston comprising a ring-carrying head, pin boss struts rigid with and projecting downwardly from said head, pin bosses rigidly carried by the lower ends of said struts, a double-X-web skirt rigidly connected at its X-crossing points with said pin bosses respectively, said skirt being entirely separated from and spaced downwardly from said head, a power stroke thrust plate laterally spaced from said pin bosses and entirely separated from said skirt, and lateral struts rigidly connected to said pin bosses and said thrust plate.

3. A piston comprising a ring-carrying head, pin boss struts integral with and projecting downwardly from said head, pin bosses integral with the lower ends of said struts, and a double-X-web skirt, said skirt comprising one X-web integrally joined at its crossing point to one of said pin bosses and having both its upper ends and its lower ends free of connection with each other, a second X-web integrally joined at its crossing point to the other of said pin bosses and having both its upper ends and its lower ends free of connection with each other, two upper web-connecting portions integrally connecting the upper ends of one of said X-webs with the upper ends of the other of said X-webs, said upper ends of said X-webs and said upper web-connecting portions being downwardly spaced from and entirely free of connection with said head, and two lower web-connecting portions integrally connecting the lower ends of one of said X-webs with the lower ends of the other of said X-webs, said upper and lower web-connecting portions being free of connection with each other except through the instrumentality of said X-webs.

4. A piston comprising a ring-carrying head, pin boss struts integral with and projecting downwardly from said head, pin bosses integral with the lower ends of said struts, a double-X-web skirt, said skirt comprising one X-web integrally joined at its crossing point to one of said pin bosses and having both its upper ends and its lower ends free of connection with each other, a second X-web integrally joined at its crossing point to the other of said pin bosses and having both its upper ends and its lower ends free of connection with each other, two upper web-connecting portions integrally connecting the upper ends of one of said X-webs with the upper ends of the other of said X-webs, said upper ends of said X-webs and said upper web-connecting portions being downwardly spaced from and entirely free of connection with said head, and two lower web-connecting portions integrally connecting the lower ends of one of said X-webs with the lower ends of the other of said X-webs, said upper and lower web-connecting portions being free of connecton with each other except through the instrumentality of said webs; a power stroke thrust plate disposed between one of said upper and one of said lower web-connecting portions and entirely separated therefrom, and lateral struts integral with said pin bosses and said thrust plate.

ARTHUR A. NELSON.